United States Patent
Bernhardt et al.

(10) Patent No.: US 8,230,945 B2
(45) Date of Patent: Jul. 31, 2012

(54) HAND MACHINE TOOL

(75) Inventors: Thomas Bernhardt, Aichtal-Groetzingen (DE); Holger Ruebsaamen, Stuttgart (DE); Andreas Schlegel, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/593,556

(22) PCT Filed: Feb. 7, 2008

(86) PCT No.: PCT/EP2008/051508
§ 371 (c)(1),
(2), (4) Date: Dec. 16, 2009

(87) PCT Pub. No.: WO2008/116690
PCT Pub. Date: Oct. 2, 2008

(65) Prior Publication Data
US 2010/0101814 A1    Apr. 29, 2010

(30) Foreign Application Priority Data
Mar. 28, 2007  (DE) .......................... 10 2007 014 758

(51) Int. Cl.
*B25D 17/24*  (2006.01)
*B25D 17/00*  (2006.01)

(52) U.S. Cl. .......................................... 173/90; 173/171
(58) Field of Classification Search .................... 310/89; 74/813 R
See application file for complete search history.

(56) References Cited

U.S. PATENT DOCUMENTS

| | | | | |
|---|---|---|---|---|
| 3,244,030 A * | 4/1966 | Godfrey | ........................ | 173/217 |
| 3,314,303 A * | 4/1967 | Maat | ............................... | 74/569 |
| 3,333,484 A * | 8/1967 | Young | ....................... | 74/424.85 |
| 4,098,351 A | 7/1978 | Alessio | | |
| 4,311,063 A * | 1/1982 | Sistare | ........................... | 74/395 |
| 4,366,869 A * | 1/1983 | Bereiter et al. | .............. | 173/109 |
| 4,892,107 A * | 1/1990 | Haber | .......................... | 600/576 |
| 5,394,039 A * | 2/1995 | Suchdev et al. | .................. | 310/51 |
| 5,598,744 A * | 2/1997 | Chen | ........................... | 74/551.1 |
| 5,904,315 A * | 5/1999 | McInerney | .................... | 242/571 |
| 2005/0081662 A1* | 4/2005 | Bouche | ........................... | 74/333 |
| 2005/0211008 A1* | 9/2005 | Goppelsroder et al. | ......... | 74/464 |
| 2008/0016983 A1 | 1/2008 | Saur | | |

FOREIGN PATENT DOCUMENTS

DE    102004036585 A1    3/2006
WO    WO 2006010675 A1 *    2/2006

* cited by examiner

*Primary Examiner* — Lindsay Low
(74) *Attorney, Agent, or Firm* — Ronald E. Greigg

(57) ABSTRACT

The invention relates to a hand machine tool which has an intermediate flange, particularly for receiving transmission elements. The flange has at least one base body having at least one bearing point. It is proposed that at least one opening is provided at least in the area of the bearing point.

19 Claims, 2 Drawing Sheets

HAND MACHINE TOOL

CROSS-REFERENCE TO RELATED APPLICATION

This application is a 35 USC 371 application of PCT/EP2008/051508 filed on Feb. 7, 2008.

BACKGROUND OF THE INVENTION

1. Field of the Invention

The invention is based on a hand-held power tool with an intermediate flange, in particular for accommodating transmission elements.

2. Description of the Prior Art

DE 10 2004 036 585 A1 has disclosed a hand-held power tool with an intermediate flange for accommodating transmission elements, which has a plurality of base bodies with bearing positions. The intermediate flange serves to accommodate a drive piston, a motor shaft, and an intermediate shaft; the intermediate flange can have a grid-shaped construction for strength reasons.

SUMMARY OF THE INVENTION

The invention is based on a hand-held power tool with an intermediate flange, in particular for accommodating transmission elements, which has at least one base body with at least one bearing position.

According to one proposed embodiment, at least one opening is situated at least in the vicinity of the bearing position. The expression "at least in the vicinity of the bearing position" is understood in particular to mean that the opening can also extend further into the base body beyond the bearing position. This simplifies the assembly and disassembly of the transmission elements of the hand-held power tool. The intermediate flange is preferably embodied as part of a transmission unit of the hand-held power tool; it is provided, for example, to accommodate elements that can be moved or driven in rotary and/or translatory fashion such as a motor shaft, a hammer tube, an intermediate shaft, a drive piston, etc. and/or to accommodate other parts in which these elements are contained or through which they are guided, e.g. a bearing, a hammer tube, etc. The intermediate flange can, however, also be embodied as part of another unit of the hand-held power tool such as a motor unit and/or can be embodied in the form of a fastening flange between two units of the hand-held power tool, e.g. between a motor unit and a transmission unit. The intermediate flange can additionally serve to absorb and dissipate forces coming from the transmission elements and/or motor elements and/or heat coming from the transmission elements and/or motor elements, which is particularly suitable for use in hand-held power tools with a housing manufactured out of plastic. In the present exemplary embodiment, the intermediate flange preferably serves to accommodate a hammer tube supported in the bearing position, an intermediate shaft, and a motor shaft. The intermediate shaft can be driven by the motor shaft via a transmission. A wobble bearing is slid onto the intermediate shaft and by means of a wobble pin, converts a rotary motion of the intermediate shaft into a reciprocating motion of a drive piston in the hammer tube.

The assembly or insertion of the wobble pin into the drive piston was previously carried out by inserting the wobble pin laterally into the drive piston through an opening in the base body and then rotating the intermediate shaft by 90°. According to the invention, at least one opening is situated at least in the vicinity of the bearing position. The opening advantageously extends further into the base body beyond the bearing position. In the present exemplary embodiment, the hammer tube is accommodated in this bearing position. Because of this embodiment, the drive piston can already be slid onto the wobble pin ahead of time and can be inserted together with the intermediate shaft equipped with the wobble pin into the opening extending in the base body and in the bearing position; the assembly direction corresponds to the direction of the base body longitudinal axis, i.e. the intermediate shaft assembly can preferably be installed axially. The elimination of the lateral insertion of the wobble pin and rotation of the intermediate shaft enables a particularly simple assembly and disassembly of the transmission elements. The assembly also requires less space since the transmission elements can be inserted axially into the opening extending in the base body and in the bearing position.

In another embodiment, the hand-held power tool has a bearing that is accommodated in the bearing position and can be open or likewise slit, at least in the vicinity of the opening of the bearing position. This advantageously permits the bearing to be inserted into the bearing position before assembly of the transmission elements. During assembly, it is then possible for the wobble pin to be inserted axially into the opening that extends in the base body, the bearing position, and the bearing.

The bearing is advantageously secured against rotating and/or sliding axially by means of at least one device in the bearing position, thus enabling the use of a simple, inexpensive slide bearing.

According to one proposed embodiment, the intermediate flange is embodied in the form of a separate component, thus making it possible to achieve a high degree of flexibility in the embodiment of the intermediate flange.

According to one proposed embodiment, the intermediate flange is at least partially integrated into a housing of the hand-held power tool, i.e. is at least partially embodied as a housing element. This achieves a reduced manufacturing complexity because the housing and the intermediate flange can be at least partially embodied of one piece with each other.

Another advantageous reduction in the manufacturing complexity can be achieved in that the intermediate flange and in particular, the first base body can be at least partially composed of two shells. This permits a simple insertion of the bearing for the hammer tube during assembly of the hand-held power tool.

BRIEF DESCRIPTION OF THE DRAWINGS

The invention will be further described in detail below in conjunction with the drawings, in which.

DESCRIPTION OF THE PREFERRED EMBODIMENT

Figure 1:
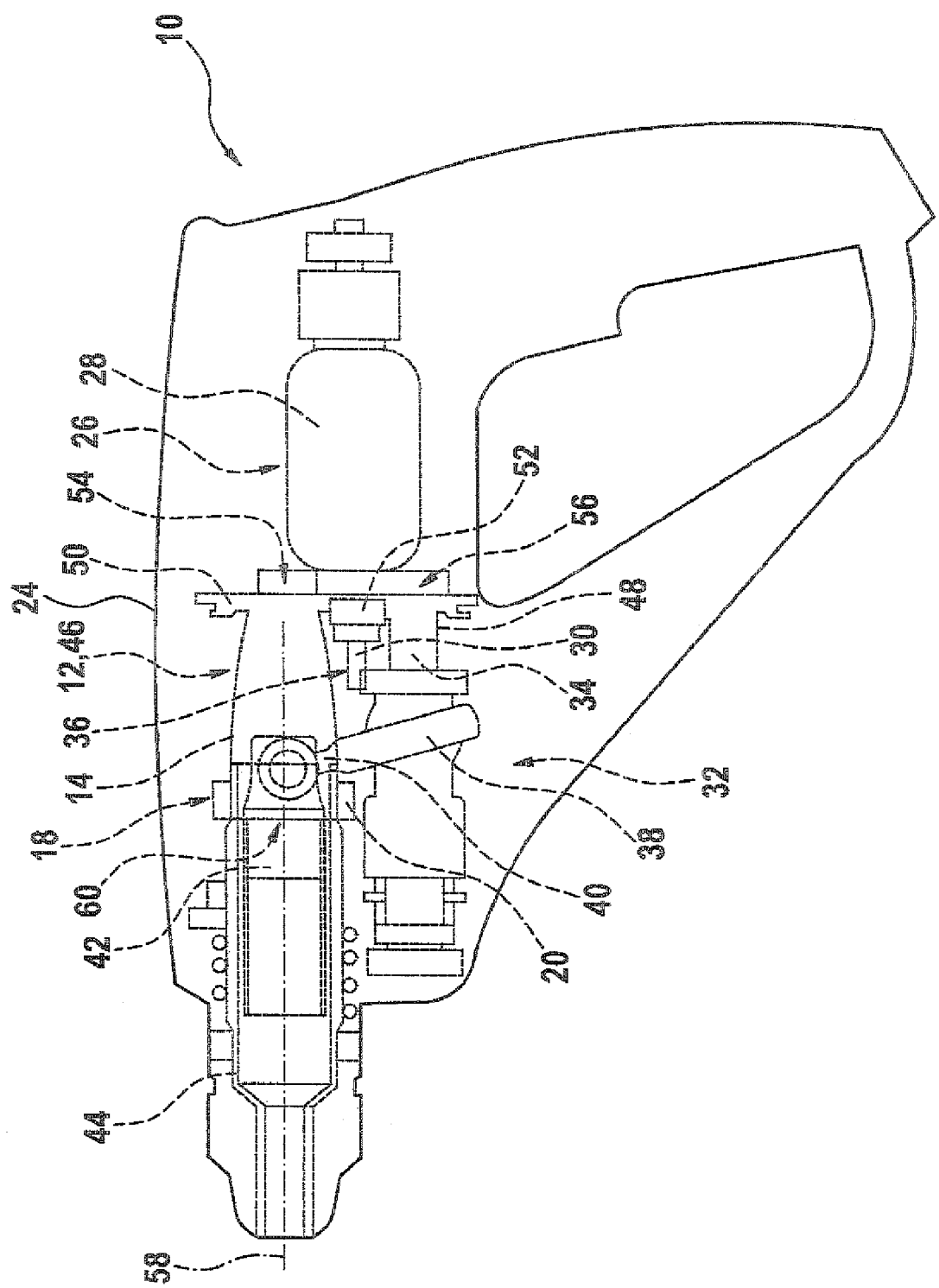
FIG. 1 shows a rotary hammer with an intermediate flange that has a base body unit.

FIG. 1 shows a hand-held power tool embodied in the form of a rotary hammer 10. It includes a motor unit 26 with a motor shaft 30 that can be driven by an electric motor 28, an intermediate shaft assembly 32 with an intermediate shaft 34 that can be driven by the motor shaft 30 via a transmission 36, and a wobble bearing 38—preferably a ball bearing—that is mounted on the intermediate shaft 34 and uses a wobble pin 40 to convert a rotary motion of the intermediate shaft 34 into a reciprocating motion of a drive piston 42 in a hammer tube 44.

The drawing also shows an intermediate flange 12, which is particularly designed to accommodate transmission elements and in which the hammer tube 44, the intermediate shaft 34, and the motor shaft 30 are bearing-mounted and which supports bearing forces of the hammer tube 44, the intermediate shaft 34, and the motor shaft 30 in a housing 24 of the rotary hammer 10, which housing is preferably manufactured out of plastic.

Figure 2:
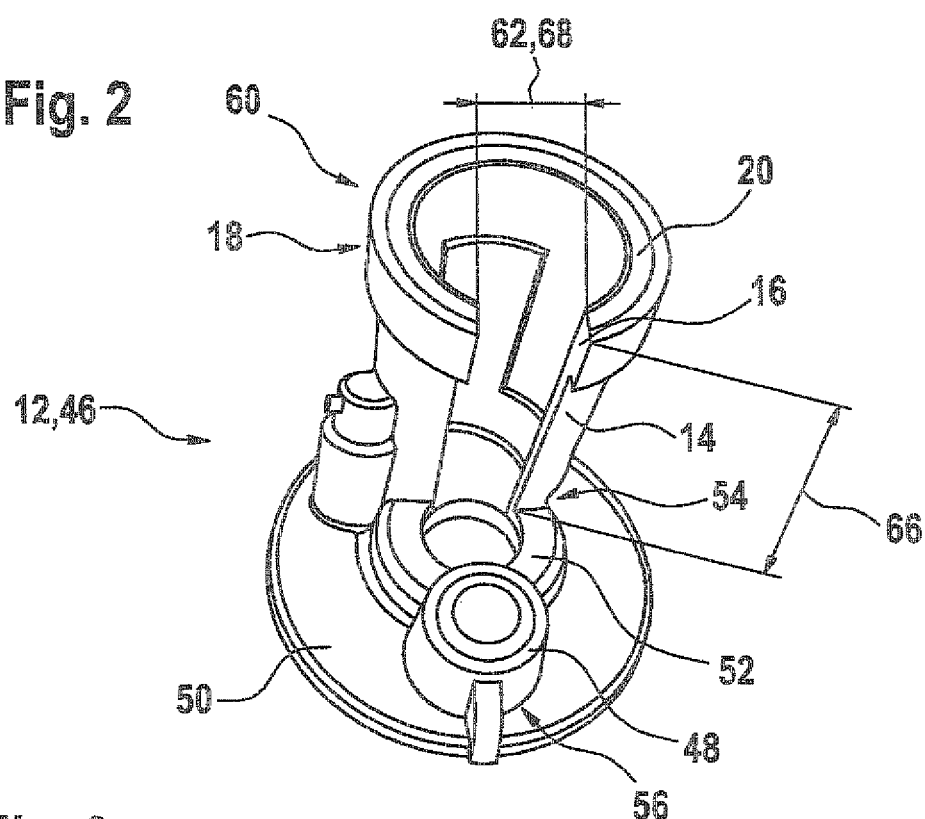
FIG. 2 shows the intermediate flange from FIG. 1 in a perspective depiction with a base body of the base body unit, which has a bearing position according to the invention.

The intermediate flange 12 is shown in more detail in a perspective depiction in FIG. 2. It is composed of a base body unit 46, which includes a first sleeve-shaped base body 14, a second sleeve-shaped base body 48, and a third essentially disk-shaped base body 50 with a sleeve-shaped extension 52 formed onto it; the two sleeve-shaped base bodies 14, 48 are attached to the third base body 50 at their first ends 54, 56.

In the present exemplary embodiment, the intermediate flange 12 is embodied in one piece. It is also conceivable, however, for the above-explained elements 14, 48, 50, 52 to be separate components that are attached to one another for example by means of welding. Alternatively, however, it is also conceivable to use other attaching methods deemed suitable by those skilled in the art such as soldered connections, riveted connections, glue connections, etc.

The first base body 14 has a bearing position 18 at its second end 60 for accommodating the hammer tube 44; the bearing position 18 is preferably embodied of one piece with the base body 14. Alternatively, the bearing position 18 can also be a separate component that is attached to the base body 14.

In order to improve the assembly of the hand-held power tool, according to the invention, at least one slot-shaped opening 16 is situated at least in the region of the bearing position 18. In the present exemplary embodiment, the opening 16 extends further into the base body 14 beyond the bearing position 18, with the opening 16 advantageously ending in the vicinity of the first end 54 of the first base body 14. Ideally, the opening 16 extends in the direction of a longitudinal axis 58 of the base body 14; the width 62 of the opening 16 in the circumference direction can change over the length 66 extending in the direction of the longitudinal axis 58. As a result, the base body 14 has an opening 16 that extends essentially the entire length of the longitudinal axis 58 of the base body 14 and is open at the top, i.e. at a second end 60 of the base body 14; the length 66 of the opening 16 depends on the embodiment of the intermediate shaft assembly 32. Furthermore, additional openings can be provided in the bearing position 18 and/or in the base body 14.

The bearing position 18 serves to accommodate a bearing 20, in particular a slide bearing, which can likewise be open or slit, at least in the vicinity of the opening 16 of the bearing position 18; here, too, it is also conceivable for the opening of the bearing 20 to be situated at other locations. Also in this case, the width 68 in the circumference direction of the opening in the bearing 20 does not have to correspond to the width 62 of the opening 16 in the base body 14 in the circumference direction; in the present exemplary embodiment, the widths 62 and 68 correspond to each other. In the present exemplary embodiment, a slide bearing 20 is provided, which is secured against rotating by means of at least one device, not visible here, in the bearing position 18. The device for preventing rotation can, for example, be composed of pins; other devices deemed suitable by those skilled in the art can also conceivably be used. In addition, the bearing 20 is secured against sliding axially by means of at least one device 22 in the bearing position 18. The device 22 for preventing axial sliding is composed, for example, of screws or tabs on the base body 14, which are bent over after installation of the bearing 20; here, too, any other suitable embodiment can also conceivably be used. Preferably, a radial fixing can be achieved, e.g. by means of a caulking.

In the present exemplary embodiment, the intermediate flange 12 is embodied in the form of a separate component. To this end, the intermediate flange 12 can be situated inside the housing 24 of the hand-held power tool 10; for example, it rests in annular fashion against a housing shell. In order to achieve a high bearing capacity of the intermediate flange 12 and nevertheless be able to embody it in as inexpensive a fashion as possible, the intermediate flange 12 is preferably composed of aluminum.

Alternatively, however, the intermediate flange 12 can also be at least partially integrated into the housing 24 of the hand-held power tool 10 or can be embodied as an element of the housing. The intermediate flange 12 can be advantageously composed of at least two shells.

Figure 3:
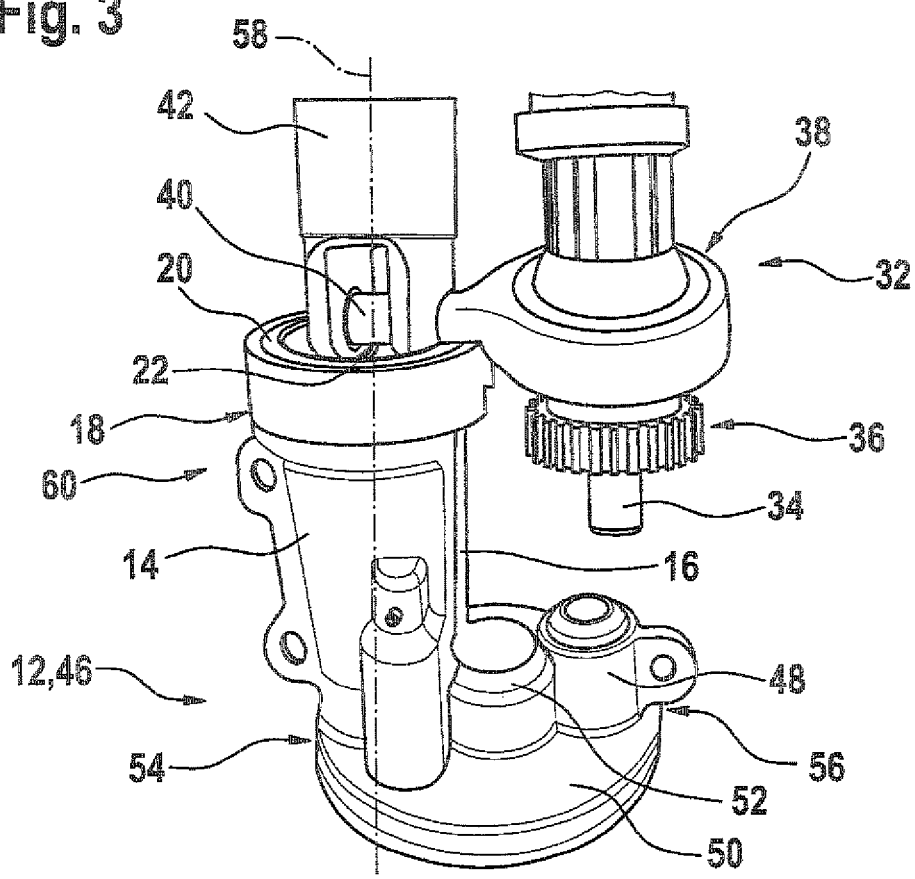
FIG. 3 shows the intermediate flange from FIGS. 1 and 2 in which an intermediate shaft assembly is installed.

In order to assemble the transmission elements 30, 34, 44 according to FIG. 3, the drive piston 42 can already be slid onto the wobble pin 40 ahead of time and can be inserted together with the intermediate shaft assembly 32 into the opening 16 extending in the base body 14, the bearing position 18, and the bearing 20; the assembly direction corresponds to the direction of the base body longitudinal axis 58. Then the intermediate shaft 34 is inserted into the second base body 48.

The foregoing relates to the preferred exemplary embodiment of the invention, it being understood that other variants and embodiments thereof are possible within the spirit and scope of the invention, the latter being defined by the appended claims.

The invention claimed is:

1. A hand-held power tool having an intermediate flange for accommodating transmission elements, the intermediate flange comprising:
    a base body unit including at least one sleeve-shaped base body having a longitudinal axis, a first end edge, a second end edge and a bearing position at the second end edge for accommodating a hammer tube, wherein the at least one sleeve-shaped base body further has an outer wall with at least one slot-shaped opening which is open at the second end edge of the at least one sleeve-shaped base body, extends in a direction of the longitudinal axis into the at least one sleeve-shaped base body beyond the bearing position to the first end edge of the at least one sleeve-shaped base body, and has a width in a circumferential direction that changes over a length of the opening in the direction of the longitudinal axis; and
    a bearing accommodated in the bearing position,
    wherein the slot-shaped opening is open at the first end edge of the at least one sleeve-shaped base body,
    wherein the bearing has a slit at least in a vicinity of the opening at the second end edge of the at least one sleeve-shaped base body,
    wherein the slit in the bearing has a width in a circumferential direction, and
    wherein the width of the slit in the circumferential direction is identical to the width of the opening in the circumferential direction.

2. The hand-held power tool as recited in claim 1, wherein the bearing is secured against rotating in the bearing position.

3. The hand-held power tool as recited in claim 1, wherein the bearing is secured against axially sliding in the bearing position.

4. The hand-held power tool as recited in claim 2, wherein the bearing is secured against axially sliding in the bearing position.

5. The hand-held power tool as recited in claim 1, wherein the intermediate flange is embodied as a separate component.

6. The hand-held power tool as recited in claim 2, wherein the intermediate flange is embodied as a separate component.

7. The hand-held power tool as recited in claim 3, wherein the intermediate flange is embodied as a separate component.

8. The hand-held power tool as recited in claim 1, wherein the intermediate flange is at least partially integrated into a housing of the hand-held power tool.

9. The hand-held power tool as recited in claim 2, wherein the intermediate flange is at least partially integrated into a housing of the hand-held power tool.

10. The hand-held power tool as recited in claim 3, wherein the intermediate flange is at least partially integrated into a housing of the hand-held power tool.

11. The hand-held power tool as recited in claim 1, wherein the intermediate flange is at least partially composed of two shells.

12. The hand-held power tool as recited in claim 3, wherein the intermediate flange is at least partially composed of two shells.

13. The hand-held power tool as recited in claim 4, wherein the intermediate flange is at least partially composed of two shells.

14. The hand-held power tool as recited in claim 8, wherein the intermediate flange is at least partially composed of two shells.

15. The hand-held power tool as recited in claim 1, wherein the hand-held power tool is a rotary hammer.

16. The hand-held power tool as recited in claim 4, wherein the hand-held power tool is a rotary hammer.

17. The hand-held power tool as recited in claim 1, wherein the bearing is a slide bearing.

18. The hand-held power tool as recited in claim 1, wherein the base body unit further has a second sleeve-shaped base body and a disk-shaped base body with a sleeve-shaped extension formed onto it, the sleeve-shaped extension being formed between the two sleeve-shaped base bodies and extending in a direction of the second end edge.

19. The hand-held power tool as recited in claim 18, wherein the second sleeve-shaped base body has a first end edge and the two sleeve-shaped base bodies are connected at their first end edges to the disk-shaped base body.

* * * * *